United States Patent
Fieau et al.

(10) Patent No.: US 10,880,393 B2
(45) Date of Patent: Dec. 29, 2020

(54) METHOD FOR CACHING A PIECE OF CONTENT IN A CONTENT DISTRIBUTION NETWORK

(71) Applicant: ORANGE, Paris (FR)

(72) Inventors: Frederic Fieau, Paris (FR); Gael Fromentoux, Pleumeur Bodou (FR); Emile Stephan, Pleumeur Bodou (FR)

(73) Assignee: ORANGE, Paris (FR)

( * ) Notice: Subject to any disclaimer, the term of this patent is extended or adjusted under 35 U.S.C. 154(b) by 263 days.

(21) Appl. No.: 15/300,132

(22) PCT Filed: Mar. 26, 2015

(86) PCT No.: PCT/FR2015/050772
§ 371 (c)(1),
(2) Date: Sep. 28, 2016

(87) PCT Pub. No.: WO2018/145079
PCT Pub. Date: Oct. 1, 2015

(65) Prior Publication Data
US 2017/0142218 A1    May 18, 2017

(30) Foreign Application Priority Data
Mar. 28, 2014 (FR) ..................... 14 52751

(51) Int. Cl.
*H04L 29/08* (2006.01)
*H04N 21/231* (2011.01)
(Continued)

(52) U.S. Cl.
CPC ...... *H04L 67/2842* (2013.01); *H04L 63/0281* (2013.01); *H04L 63/0428* (2013.01);
(Continued)

(58) Field of Classification Search
CPC . H04L 67/2842; H04L 65/60; H04L 65/1069; H04L 63/0428; H04L 67/1002;
(Continued)

(56) References Cited

U.S. PATENT DOCUMENTS 6,173,311 B1 * 1/2001 Hassett ............... H04L 67/2814
                                                              709/202
2002/0016911 A1    2/2002 Chawla et al.
(Continued)

OTHER PUBLICATIONS

Adam Stubblefield et al, "Managing the Performance Impact of Web Security" Electronic Commerce Research, Kluwer Academic Publishers, BO, vol. 5, No. 1, Jan. 1, 2005 (Jan. 1, 2005), pp. 99-116, XP019206445.
(Continued)

*Primary Examiner* — June Y Sison
(74) *Attorney, Agent, or Firm* — David D. Brush; Westman, Champlin & Koehler, P.A.

(57) ABSTRACT

A method for caching a piece of content in a content distribution network of a first network, a browser module running on a user terminal and allowing access to content by using encrypted sessions, the browser module being associated with a proxy server of a second network interconnected with the first network, the proxy server controlling a current session status between the browser module and a content provider. The method includes: the browser module sending a request relating to the content to the content provider; the proxy server obtaining a piece of information relating to the request; the browser module receiving the requested content; and the proxy server commanding the browser module to cache the content in the content distribution network.

15 Claims, 3 Drawing Sheets

(51) Int. Cl.
   *H04N 21/222* (2011.01)
   *H04N 21/239* (2011.01)
   *H04L 29/06* (2006.01)

(52) U.S. Cl.
   CPC .......... *H04L 65/1069* (2013.01); *H04L 65/60* (2013.01); *H04N 21/222* (2013.01); *H04N 21/2393* (2013.01); *H04N 21/23106* (2013.01); *H04N 21/23116* (2013.01)

(58) Field of Classification Search
   CPC .............. H04L 63/0281; H04N 21/222; H04N 21/23106; H04N 21/23116; H04N 21/2393
   See application file for complete search history.

(56) References Cited

U.S. PATENT DOCUMENTS

| | | | |
|---|---|---|---|
| 2002/0091792 | A1 | 7/2002 | Janniello et al. |
| 2003/0074425 | A1* | 4/2003 | Kawakita ................ H04L 29/06 709/219 |
| 2005/0010653 | A1 | 1/2005 | McCanne |
| 2011/0131341 | A1* | 6/2011 | Yoo ................... G06F 17/30902 709/237 |
| 2012/0254341 | A1* | 10/2012 | Lowery ............... G06F 17/3087 709/213 |
| 2013/0166669 | A1* | 6/2013 | Luna ..................... G06F 9/5016 709/212 |

OTHER PUBLICATIONS

Written Opinion of the International Searching Authority dated Mar. 26, 2015, for corresponding International Application No. PCT/FR2015/050772, filed Mar. 28, 2014.

International Search Report dated Aug. 28, 2015, for corresponding International Application No. PCT/FR2015/050772, filed Mar. 26, 2015.

International Preliminary Report on Patentability and English translation of the Written Opinion of the International Searching Authority dated Oct. 4, 2016 for corresponding International Application No. PCT/FR2015/050772, filed Mar. 28, 2014.

* cited by examiner

METHOD FOR CACHING A PIECE OF CONTENT IN A CONTENT DISTRIBUTION NETWORK

CROSS-REFERENCE TO RELATED APPLICATIONS

This Application is a Section 371 National Stage Application of International Application No. PCT/FR2015/050772, filed Mar. 26, 2015, the content of which is incorporated herein by reference in its entirety, and published as WO 2015/145079 on Oct. 1, 2015, not in English.

FIELD OF THE DISCLOSURE

The invention is situated in the field of content distribution in a communication network and more particularly relates to a technique for caching an item of content in a content distribution network.

BACKGROUND OF THE DISCLOSURE

It is known for an operator to use content distribution networks to distribute content in a communication network. Generally, these networks comprise origin servers and substitute servers. The origin servers are servers from which the content is introduced in the content distribution networks. For example, these are content providers (e.g. audiovisual content producers) offering their content to Internet site managers or to Internet access providers. This content is then duplicated, for example according to its popularity, in substitute servers located as close as possible to a point of access to the Internet (or "point of presence"). Content distribution networks include a routing mechanism for serving a request from a user relating to an item of content via the substitute server located as close as possible to the access point of the user. These substitute servers thus provide for not requesting the origin servers and for reducing routing costs during content delivery. It is also emphasized that content distribution networks can be used to distribute any type of content. This can be audiovisual content such as video or audio files, of streams intended to be played continuously. An item of content thus denotes an "entire" piece of content (e.g. the whole of a video or audio file) or an item of content formed by one or more segments of an entire piece of content.

Moreover, new players are moving into the content distribution chain. These implement proxy servers with which browser modules are associated. These proxy servers, also called "browser accelerators", generally have their own content duplication functions, as well as functions of data compression, request optimization and filtering, with the aim of reducing access times for a user to a service or to a requested item of content. The content duplication solutions provided by these proxy servers however exhibit drawbacks. The duplicated content is generally stored at peering points between the network to which such proxy servers belong and the network for example of an Internet access provider. A user of the Internet access provider network can thus obtain a desired item of content via his/her browser module only from substitute servers located at the interconnection of the Internet access provider network and the network to which such proxy servers belong. These solutions do not provide for duplicating an item of content as close as possible to the access of a user of the Internet access provider network, and this has the effect, among other outcomes, of generating significant traffic within the network.

Furthermore, discussions relating to the definition of the next version of the HTTP protocol, "HTTP/2", within the IETF (Internet Engineering Task Force) are turning to a generalized usage by browser modules of secure exchange protocols, for all the traffic transmitted by the latter. This poses more particularly problems in the context of content distribution, in which such secure exchanges do not allow an Internet access provider to access the object of a request relating to an item of content. The access provider is thus unable to obtain information allowing it to determine the requested content, and unable to obtain the content in order to implement a policy of caching this content via its own distribution network.

One of the aims of the invention is to remedy deficiencies/drawbacks of the prior art and/or to bring about improvements thereto.

SUMMARY

According to a first aspect, the invention relates to a method for caching an item of content in a content distribution network, this distribution network being a network of a first communication network, a browser module running on a user terminal and providing for accessing content by means of encrypted sessions, the browser module being associated with a proxy server of a second communication network interconnected with the first communication network, the proxy server controlling the state of a session in progress between the browser module and a content provider, the method comprising the following steps:

the browser module sending a content-related request to the content provider;

the proxy server obtaining from the browser module at least one item of information relating to the request;

the browser module receiving the content requested from the content provider;

the proxy server commanding the browser module to cache the content in the content distribution network.

The method thus proposes a solution for caching an item of content in for example a content distribution network of an Internet access provider, providing for duplicating the content as close as possible to the access of the users of the access provider network. Due to more effective processing of content-related requests, the traffic within the provider network is found to be reduced. Users of the Internet access provider network requesting an item of content which has been cached in the distribution network of the access provider additionally benefit from faster distribution. User satisfaction is thus improved.

Moreover, this caching is made possible when outgoing messages sent from the browser module are encrypted. The method can thus advantageously be implemented by browser modules using the HTTP/2 over TLS protocol for messages that they transmit. In particular, since the content is obtained from the user terminal, the method provides for introducing the unencrypted content into the content distribution network in order to cache it. It is thus possible to benefit from the advantages of content distribution through a content distribution network as close as possible to the users. The securing of exchanges relating to requested content is nevertheless maintained insofar as the caching of the content in the content distribution network is performed only upon a network command.

According to a particular feature, the control of the state of a session in progress consists in checking that the content-related request is redirected by the proxy server to the content provider, after the proxy server has received the request via an encrypted session established with the browser module, the obtaining of the at least one item of request-related information being obtained when the request is being received by the proxy server.

The proxy server is in this case in a "flow intercepting" arrangement. More specifically, an encrypted session is established between the browser module and the proxy server with which it is associated. When a request relating to an item of content intended for a content provider is sent from the browser module, it is first sent to the proxy server via this encrypted session, and then redirected by the latter to the content provider. The proxy server thus permanently has access to the content of the messages received from the browser module. It can notably obtain in real time information relating to a requested item of content. The requested content is thus easily identified, thereby having the effect of simplifying and limiting exchanges with the proxy server when the caching method is implemented. The proxy server in fact has immediate access to the data transiting via the encrypted session. The step for obtaining information relating to the requested content therefore does not require, in addition to the request relating to an item of content, the sending to the proxy server of reports relating to the content requests transmitted by the browser module according to, for example, an asynchronous mode.

In addition this reduction of exchanges, made possible by this particular configuration of the proxy server, provides for accelerating the caching of the requested content.

According to a particular feature, the method additionally comprises the following steps implemented by a control server belonging to the first communication network:

receiving from the proxy server, a notification indicating that at least one content-related request has been transmitted by the terminal on which the browser module that has transmitted the request is running;

selecting, according to the content and the terminal, a content distribution network in which to cache the content from among a set of content distribution networks belonging to the first communication network;

sending to the proxy server an identifier of the selected distribution network.

The selection of a content distribution network is centralized at the control server. The control server provides, for example, for choosing the content distribution network according to criteria based on the closeness of access points of the users of the network of an Internet access provider, the availability of the candidate content distribution networks, or according to the type of content to be cached. The control server thus provides for choosing a distribution network suitable for the content and/or the terminal from which a request relating to an item of content has been transmitted. In the case, for example, in which this network is that of an Internet access provider, the proxy server, which does not have access to the content distribution networks of the provider, is capable of commanding a caching of a requested item of content in a content distribution network chosen by the access provider. This selection is notably made possible by the fact that unlike the proxy server, the control server is located in the provider network and has overall knowledge of the content distribution networks belonging to the provider network. Additionally, confidentiality of the information which the control server has for the selection of a content distribution network, notably on the structure of the access provider network, is preserved. Specifically, this information is not communicated to the proxy server.

Centralized management of content distribution networks by the control server moreover facilitates the maintenance of infrastructures implementing the method. The addition or removal of a content distribution network, but also the selection of an alternative distribution network in the event that a content distribution network is unavailable are simple to implement and have no impact on other network equipment.

The selection of the distribution network furthermore allows offered services to be differentiated according to the requested content, and/or according to the terminal via which a request has been transmitted. For example, it allows a content distribution network to be associated with content requiring a particular type of distribution (e.g. streaming, restricted broadcast). A content distribution network can likewise be associated with certain types of terminals, for which particular criteria based on quality or security are demanded as regards the distribution of a requested item of content.

According to a particular feature, the method additionally comprises a step implemented by the control server of receiving from the proxy server information relating to at least a second browser module having a session established with the proxy server, the content distribution network being selected based on this information.

The information received by the control server is by way of example the number of browser modules having a session established with the proxy server, information identifying the browser modules (e.g. the HTTP header field "User-Agent"), or the list of IP addresses of the user terminals on which these modules run. In a mobile telephony network, the control server can thus locate the terminals from their IP address, and select a content distribution network according to this location.

According to a particular feature, the method additionally comprises a step of sending to the proxy server a caching policy containing at least one item of data for which a caching of the content is triggered.

The data contained in the caching policy sent to the proxy server can be used to distinguish between the items of content that an Internet access provider wishes to cache. This data is for example an identifier of a network resource (e.g. a uniform resource locator), an identifier of a content provider (e.g. IP (Internet Protocol) address) or more generally an identifier of a resource referencing several items of content. This data can also make reference to a range of addresses. This data thus provides for restricting a caching in a distribution network of the Internet access provider to specifically identified content or to content supplied by specifically identified resources. This data is not limited to identifiers making reference to content; it can also include indicators of a quality level for content to be cached, or indicators of popularity of an item of content. A caching operation can thus advantageously be restricted to content exhibiting a quality level higher than a predefined quality level, or be restricted to content for which a minimum number of requests relating to the content is verified by the proxy server. It is also to be noted that these items of data, which form criteria for deciding whether an item of content must be cached in a distribution network of the access provider, can be combined with each other to form new decision criteria.

According to a particular feature, the at least one item of data contained in the caching policy is a list of uniform resource locators, the method additionally comprising a step of the proxy server checking, with the aid of the at least one item of request-related information, that the request is to a content provider belonging to the list of uniform resource locators, the command to cache the content then being conditional upon whether the content provider belongs to the list.

"Uniform resource locator" refers to a string of characters used to address the resources made available on the Internet network. These resources can be of different types: HTML document, image, sound, video, website, etc. These addresses can in particular refer to a server of a content provider, a server of a content distribution network, or even the items of content themselves provided by the servers. The list of uniform resource locators can thus be used to restrict the caching of content to a predetermined number of these resources. In particular it can be used to not send a caching command for an item of content from a third party for which a caching action is not desired. The caching of an item of content is thus only implemented for trusted third parties. Notably, it has the effect of protecting the first network (for example that of an Internet access provider) from an introduction of content likely to present a risk to its integrity.

Various policies relating to the distribution of content can moreover be obtained by a particular definition of the list of uniform resource locators. An Internet access provider can for example construct a list for a particular type of content provider (e.g. a list containing only content providers referred to as "premium").

According to a particular feature, the method comprises the following steps:

the control server storing a cached content identifier in combination with an identifier of the distribution network in which the content has been cached;

and following the reception of a further content-related request:

the proxy server checking, with the aid of the content identifier and of the at least one item of request-related information, that the requested content has been cached;

the proxy server redirecting the request to the distribution network in which the requested content was previously cached.

By sending content identifiers and distribution network identifiers, the proxy server can be informed of content which has been cached. Thus, a request to the content provider by the proxy server can be avoided when it concerns an item of content that has already benefited from being cached. This also results in a reduction in the number of messages exchanged in the networks implementing the method.

According to a particular feature, the method additionally comprises a step of the proxy server sending the cached content identifier in combination with the identifier of the distribution network in which the content has been cached to at least a second browser module having a session established with the proxy server, another request transmitted from the at least one second browser module for the requested content being redirected by the at least one second browser module to the distribution network in which the content has been cached.

The proxy server, at a given instant, has in general several sessions open with browser modules which are associated with it. Through these sessions, a proxy server can inform the browser modules, with which a session is established, of the caching of an item of content and of the content distribution network in which the content has been cached. As such, notably, the terminal, prior to a request relating to an item of content and transmitted by its browser module, can directly check that the content has already been cached. In that case, the browser module advantageously redirects the content request directly to the content distribution network in which the content has been cached, without passing via the proxy server. The processing of the request relating to an item of content is accelerated, and the traffic to the content provider reduced. Interconnection costs between the first and second networks also turn out to be reduced.

According to a particular feature, the method additionally comprises the control server sending to the proxy server a set of instructions that can be executed by the browser module, this set being transmitted by the proxy server, with the command requesting the caching of the content, and being executed by the browser module prior to the caching.

The sending of instructions that can be executed by the browser module, for example instructions in a programming language such as the language JavaScript, enables preprocessing to be carried out on the content to be cached before it is actually cached. This preprocessing consists for example in segmenting the content, or encoding it in another format, in order to facilitate its caching and its later restoration by the content distribution network. These operations are additionally advantageously performed by the terminal on which the browser module runs. Thus a saving is achieved on the computation resources of the control server and proxy server.

Furthermore, the sending of executable instructions also exhibits the advantage of securing the caching command. Specifically, these instructions add complexity to the proxy server obtaining the caching policy of the Internet access provider.

According to a second aspect, the invention relates to a browser module comprising program code instructions intended to command the execution of the following steps, when the module is executed on a terminal:

accessing content by means of encrypted sessions and sending a request relating to an item of content to a content provider;

receiving an item of content requested from a content provider;

receiving from a proxy server a command to cache in a content distribution network a previously received item of content;

commanding, following reception of the caching command, the sending of an item of content previously received by the terminal on which said module is running, to a content distribution network.

According to a third aspect, the invention relates to a proxy server, connected with a browser module, comprising:

a first control module arranged to control the state of a session in progress between the browser module and a content provider;

an obtain module arranged to obtain from the browser module at least one item of information relating to a requested item of content;

a command module arranged to command the browser module to cache an item of content received from the latter in a content distribution network, the command containing an identifier of the distribution network;

a second control module arranged to check whether an item of content has been cached in a content distribution network of the communication network.

According to a fourth aspect, the invention proposes a system for caching an item of content in a content distribution network, the distribution network being a network of a first communication network, comprising a browser module according to the second aspect associated with a proxy server according to the third aspect, the proxy server belonging to a second communication network interconnected with the first communication network.

According to a particular feature, the system additionally comprises a control server, the control server belonging to the communication network and being arranged to:

select the content distribution network in which to cache the content, and to notify the proxy server of the selected content distribution network.

The advantages exhibited for any one of the particular features according to the first aspect can be directly transposed to the caching system according to the fourth aspect.

According to a fifth aspect, the invention also relates to a program for a proxy server, comprising program code instructions intended to control the execution of the steps of the method described previously, when said program is executed by the proxy server and a recording medium that can be read by a proxy server on which a program for a proxy server is recorded.

According to a sixth aspect, the invention relates to a recording medium that can be read by a terminal, on which a browser module is recorded.

BRIEF DESCRIPTION OF THE DRAWINGS

The invention will be better understood with the aid of the following description of particular embodiments, with reference to the appended drawings in which.

DETAILED DESCRIPTION OF ILLUSTRATIVE EMBODIMENTS

Figure 1A:
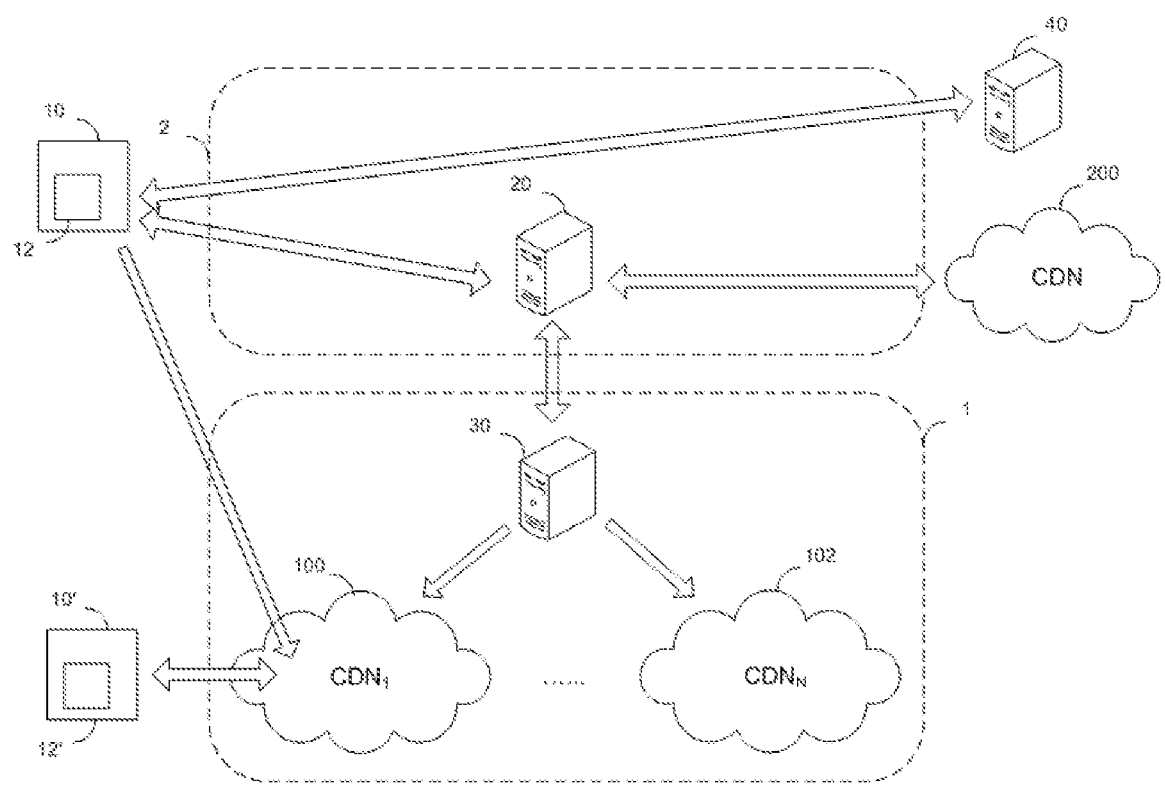
FIG. 1a represents a system for caching an item of content according to a first particular embodiment.

FIG. 1a represents a system for caching an item of content in a content distribution network according to a first particular embodiment. The system comprises a proxy server 20 with which there is associated a browser module 12 running on a user terminal 10 (e.g. a computer, cellphone, tablet), and a control server 30. The system is arranged to cache in a content distribution network an item of content desired by a user of the terminal 10 upon receiving a caching command transmitted by the proxy server 20. The user uses for example a man-machine interface of the browser module 12 in order to select the desired content. The browser module 12 is arranged to obtain the required content from a content provider 40. A second terminal 10' on which there runs a browser module 12' associated with the proxy server 20 is also represented. The browser module 12' is arranged to obtain an item of content cached in a content distribution network. Hereafter, a requested item of content will refer to an item of content requested by a user of the terminal 10, or equally to a content-related request transmitted by the browser module 12.

The proxy server 20 is for example located in a network 2. The proxy server is in particular an item of physical equipment which is not administered by the Internet access provider which manages the network 1. The proxy server 20 is for example dedicated to the acceleration of requests transmitted by the browser modules associated with it. Furthermore, it is arranged to control the states of the sessions in progress between the browser modules 12, 12' and the content provider 40. In another embodiment, the proxy server 20 is a module integrated with an item of equipment of the network 2 (e.g. router, access gateway).

The control server 30 is an entity through which the management of the various content distribution networks of the network 1 can be centralized. It is located in a communication network 1 and communicates with content distribution networks 100, 102 also located in the network 1. The network 1 is for example the network of an Internet access provider. The control server 30 also communicates with the proxy server 20.

In this first embodiment, a request relating to an item of content C is transmitted from the browser module 12 to the content provider 40. This request is for example a request in accordance with the HTTP/2 over TLS protocol and relates to an audio or video resource provided by the content provider 40.

According to a known operation for this type of browser module 12, information relating to the requested content and to the obtained content is sent at regular intervals to the proxy server 20. This information is used by the proxy server 20 to identify these items of content. This is particularly useful for the requests relating to content sent via encrypted sessions, this content being unable in this latter case to be identified from the requests themselves. In one embodiment, the information on the content requested and/or obtained is then transmitted to the control server 30. The control server 30 is arranged to select with the aid of this information a content distribution network, suitable for distributing the types of content identified, in which to cache the content. It is also arranged to then indicate to the proxy server 20 the distribution network 100 selected for caching the content. The proxy server 20 is arranged to command the browser module 12 to cache the content C, which was previously delivered to it, in the content distribution network 100 selected by the control server 30. Upon receiving the caching command, the browser module 12 sends the content C to the selected content distribution network 100.

In a particular embodiment, the caching system does not include a control server 30. In that case, the proxy server 20 commands for example the caching of the identified content in a predefined content distribution network 100, 102.

In a particular embodiment, the proxy server 20 is also arranged to send an identifier of the cached content to the browser modules having a session established with the proxy server. A second terminal 10' having a session established with the proxy server 20 is then able to request the content cached by the terminal 10 directly from the content distribution network 100.

Only two terminals 10, 10' are represented; however there is no restriction concerning the number of terminals connected with the proxy server 20.

In another embodiment, the proxy server is located in the network 1 but is not administered by the Internet access provider or the operator of the network 1.

Figure 1B:
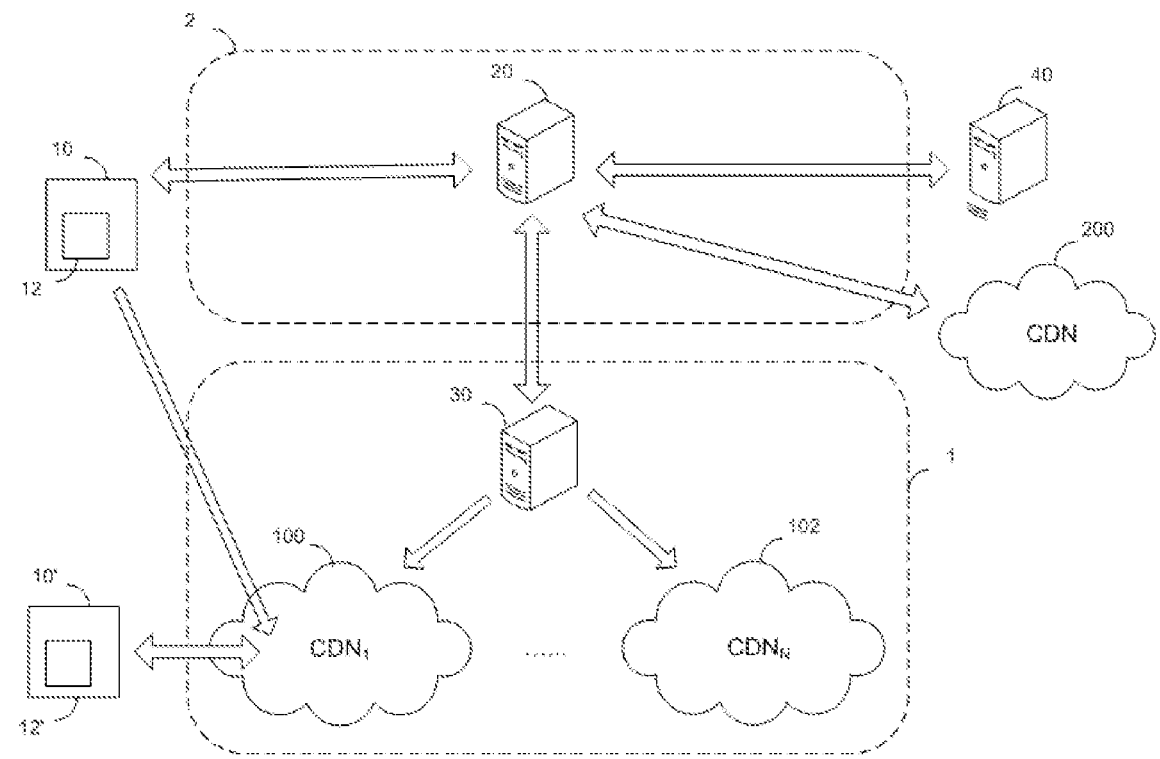
FIG. 1b represents a system for caching an item of content according to a second particular embodiment.

FIG. 1b represents a system for caching an item of content in a content distribution network according to a second particular embodiment. In this second embodiment, the proxy server 20 is an item of equipment of the network 2 intercepting exchanges between the user terminal 10 and the content provider 40. All the requests relating to an item of content and transmitted by the browser module 12 running on the user terminal 10 pass through the proxy server 20. These requests are more particularly sent from the browser module 12 via an encrypted session established with the proxy server 20. They are then redirected to the content provider 40 that is the addressee of the content-related request. This particular location of the proxy server 20 notably enables the latter to immediately have information about the requested content without waiting for this information to be sent to it by the browser module 12 after the content C has been delivered.

The other elements of the system are identical to that which has been described previously with reference to FIG. 1a.

Figure 2:
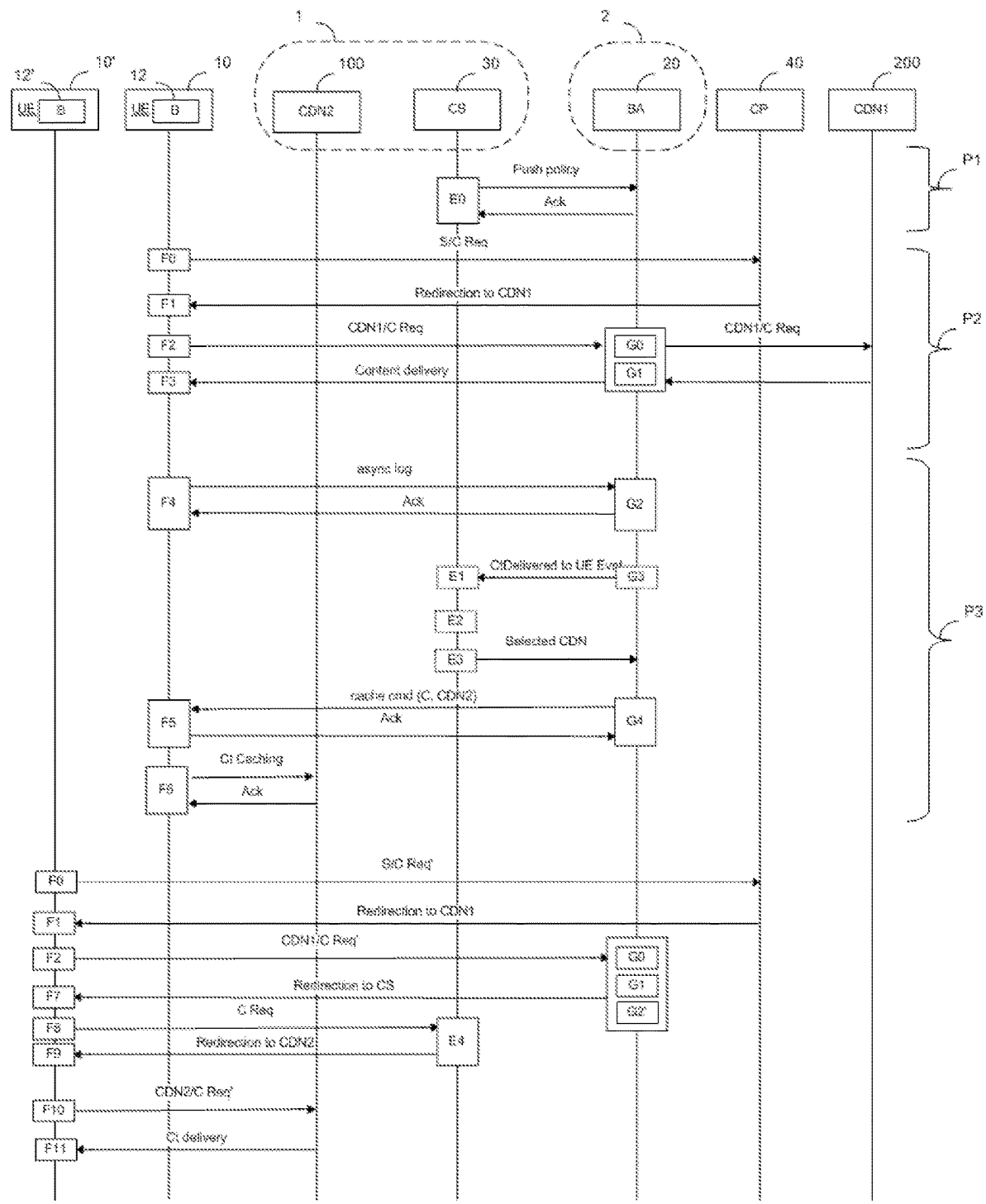
FIG. 2 is a diagrammatic representation of the steps of the method for caching an item of content and of the exchanges between equipment implementing the method according to a particular embodiment.

FIG. 2 is a diagrammatic representation of the steps of the method for caching an item of content and of the exchanges between the equipment implementing the method in a system according to FIG. 1a. The steps for obtaining the content, once the latter is cached, are also represented.

The method is made up of three phases P1, P2, P3. The first phase P1 forms a configuration phase of a caching system as described with reference to FIG. 1a. The second phase P2 corresponds to a first delivery to a user terminal 10 of a content C requested via a browser module 12 running on the user terminal 10. The third phase P3 corresponds for its part to the steps of the method for the actual caching of the content C in a content distribution network $CDN_1$ 100 belonging to the network 1.

During the first phase P1, a control server 30, located for example in the network 1 of an Internet access provider, transmits during a step E0 a caching policy to the proxy server 20 located in a network 2 not managed by the Internet access provider. The caching policy defines a list of uniform resource locators for which the caching method is implemented. These uniform resource locators are for example addresses of servers of content providers or of content distribution networks offering content. They can also be reduced to a domain name, thus indicating that the caching method must be implemented for all the content provided for this domain name. In particular, the list of uniform resource locators provides for differentiating between content to be cached in the network 1 of the Internet access provider and content for which such a caching action is not sought. It references for example content providers that are partners of the Internet access provider, for which caching in the network 1 of this provider is sought. This list can also comprise an indicator of a quality level beyond which caching is desired. The sending at step E0 of the caching policy can also be accompanied by a set of instructions (e.g. JavaScript code) that can be executed by user terminals, or by a file referred to as "manifest" setting out a list of addresses of segments of an item of content ("chunks") associated with a quality level. This list of executable instructions and the manifest file will be detailed later.

Still during step E0, the proxy server 20 transmits an acknowledgement to the control server 30 in order to indicate to the latter that the caching policy has definitely been received. In another embodiment, this acknowledgement contains a list of identifiers of user terminals having a session established with the proxy server 20. This latter list can furthermore be filtered in order to contain only identifiers of user terminals subscribed to the services of the Internet access provider.

The first phase P1 ends with the reception of the acknowledgement from the proxy server 20. This phase is repeated at regular intervals in order that the proxy server 20 can have an up-to-date caching policy.

In the second phase P2, the browser module 12 sends during a step F0 a request relating to an item of content C to a content provider 40 via an encrypted session. By way of illustrative example, the request relating to the content C is an HTTP/2 over TLS request: "Get www.svr.fr/C". The content provider 40 returns in response to this request a message of redirection to a content distribution network 200 located outside the network 1 of the Internet access provider, where the content is stored. This redirection message is received by the browser module 12 during a step F1.

During a step F2, the request relating to the content C is redirected by the proxy server 20 to the content distribution network 200. It is emphasized here that this network does not have servers located in the network 1. Thus, the delivery of the content from this content distribution network involves the contribution of a significant number of items of equipment of the communication network 1.

More specifically, the request relating to the content C is transmitted via a TLS encrypted session to the proxy server 20. The latter checks during a step G0 whether the identifier of the content distribution network 200 belongs to the uniform resource locator list defined by the caching policy obtained during phase P1. Here, the particular case is considered in which the identifier of the content distribution network does belong to the list of addresses. The proxy server 20 then checks during a step G1, with the aid of the identifier of the requested content, whether the latter has already been cached in a content distribution network of the network 1. To this end, the identifier of the requested content is for example compared with a list of identifiers of cached content, stored by the proxy server 20. Since the content C is not identified as having already been cached in a content distribution network of the network 1, the proxy server 20 transmits the request relating to the content C to the content distribution network 200 in which this content is stored. The content C is then sent to the browser module 12, which receives it during a step F3. This reception of the content C by the browser module 12 corresponds to a first reception of the content by the browser module before it is cached in the network 1, and ends the second phase P2.

At step G0, for the case in which the identifier of the content distribution network 200 is not identified as belonging to the uniform resource locator list defined by the caching policy, the request relating to the content C is simply transmitted to the content distribution network 200 in accordance with the known technique.

The third phase P3 starts with the browser module 12 sending to the proxy server 20, during a step F4, information relating to the content obtained by the browser module 12. This information is for example a history of the requests relating to an item of content and transmitted from the browser module 12. The information comprises in particular the identifier of the content C obtained by the browser module 12 during the second phase P2 and an identifier of the content distribution network 200 from which the content C was obtained.

The proxy server 20 sends an acknowledgement to the browser module 12, then uses the information received from the browser module 12 to determine, during a step G2, whether the content C is an item of content to be cached in the network 1. To this end, as described previously for steps G0 and G1, the proxy server 20 checks whether the identifier of the content distribution network 200 corresponds to an address for which caching in the network 1 is desired (step G0), and whether furthermore the content C has not yet been cached in the network 1 (step G1).

In another embodiment, the proxy server 20 stores a list of items of content to be cached, which list is updated during phase P1 following steps G0 and G1. Step G2 is not implemented. The content C is then added to the list of items of content to be cached at the end of steps G0 and G1, i.e. when on the one hand caching in the network 1 is desired for the content distribution network 200 from which the content C was obtained, and on the other hand the content C has not yet been cached in the network 1. This list can be stored locally or in a remote database controlled for example by the Internet access provider. There is however no restriction as regards administration of this database which can also be delegated to a third entity.

Furthermore, for the case in which, during step G2, the content C is identified as having already been cached in the network 1, this step G2 brings the caching method to an end.

When the content C is identified as being an item of content to be cached, the proxy server 20 then sends during a step G3 a notification to the control server 30. This notification informs the latter that the content C has recently been delivered to the browser module 12 running on the user terminal 10. It notably includes an identifier of the content C, and an identifier of the user terminal 10.

The control server 30 selects during a step E2 a content distribution network 100, 102 belonging to the network 1 according to the identifier of the content C and that of the user terminal 10. The identifier of the content C and that of the user terminal 10 are given by way of example. There is no restriction as to the criteria used for the selection of the content distribution network by the control server 30. The control server 30 has the means to select the content distribution network that is the most suitable for storing the content C in the network 1. By way of example, the content distribution network 100 is associated, by a policy of the Internet access provider, with the type of terminal having the content C and with the type of content C requested, and is selected.

Optionally, the control server 30 can also, during this step E2, perform a check as to whether a caching of the content C is authorized according to a caching policy defined by the Internet access provider. Such a policy consists for example in excluding from caching in the network content having a memory size smaller than a threshold.

Once the content distribution network 100 of the network 1 is selected, the control server 30 transmits to the proxy server 20, during a step E3, an identifier of this distribution network 100 for caching the content C. It also memorizes that the content C is cached in the content distribution network 100.

The proxy server 20 sends during a step G4 a command for caching the content C in the content distribution network 100 to the browser module 12. During a step F5, the latter receives the caching command and sends an acknowledgement to the proxy server 20 in order to notify it that the command has definitely been received. The sending of the caching command is more particularly performed in "push" mode, i.e. without the user terminal 10 having requested beforehand that the command be sent. The caching command contains the identifier of the content C to be cached, the identifier of the selected content distribution network 100 for the caching of the content C, and optionally instructions for preprocessing the content before the content is cached, which instructions can be executed by the user terminal 10. The preprocessing instructions provide, for example, for converting the content C into a given format, or for splitting it into several data segments. The preprocessing instructions also add complexity to accessing the content distribution policy implemented by the Internet access provider for the proxy server 20, thereby reinforcing the confidentiality of the policy. A manifest file can also be associated with the sending of the caching command. The manifest file is for example obtained from the control server 30 during step E0. This file contains a set of uniform resource locators to content categorized by quality levels. The uniform resource locators of the manifest file identify for example content which has previously been cached. In one embodiment, this file can advantageously be used by the terminal 10 to maximize the number of requests directly addressed to the content distribution network in which an item of content has been cached.

During a step F6, the content C stored on the user terminal 10 is sent to the content distribution network 100 identified with the aid of the network identifier received with the caching command. If necessary, the content preprocessing instructions are executed by the user terminal 10 before the content is sent to the content distribution network 100. Step F6 brings an end to both the third phase P3 and the caching method.

In another embodiment, the selection of a content distribution network by the control server 30 is optional. Steps G3 and E1 to E3 are hence not implemented. The content distribution network 100 in which the content C is cached is predefined by the Internet access provider. The identifier of the predefined content distribution network is for example communicated to the proxy server 20 during system configuration step E0.

In another embodiment, during step G0, a check as to whether the content C is an item of content for which caching is desired is performed based on a content identifier or an IP address of a content provider. An item of content can for example be explicitly referred to by a uniform resource locator. A range of addresses can also be defined by a network mask applied to an IP address. This range thus provides for indicating a set of items of content to be cached. An item of content to be cached can also be identified from a manifest file. In this latter case, an item of content is for example verified to be an item of content to be cached when the quality level associated with it in the manifest file is higher than a quality level predefined by the caching policy received by the proxy server 20 during step E0. Likewise, the control server 30 can indicate to the proxy server 20, via this caching policy, a threshold of requests relating to the content beyond which step G3 is implemented.

In another embodiment, the control server 30 selects a content distribution network based on information received from the proxy server 20, relating to browser modules that have a session established with the latter. This information is for example sent by the proxy server 20 during the acknowledgement of receipt of the caching policy at step E0, or during the sending of a notification at step G3. This information can also be the subject of a specific send action to the control server 30. Information relating to the quality level of an item of content or to a popularity level of the content can also be taken into account when the content distribution network is being selected. This information includes for example quality levels associated with content referred to by a manifest file or the number of queries requesting an item of content over a predefined time interval.

In another embodiment, with reference to the system of FIG. 1b, the sending to the proxy server 20, by the browser module 12, of information relating to the content which it has obtained is optional. In this case, step F4 is not implemented. It is recalled here that, in this embodiment, the proxy server 20 is arranged to intercept exchanges between the user terminal 10 and the content provider 40.

The steps for obtaining an item of content cached in a content distribution network of the network 1 will now be described.

In a manner similar to their execution described with reference to phase P1, steps F0 to F2, G0 and G1 are performed again. These steps concern a new request relating to the content C. This new request is transmitted from a browser module 12' running on a user terminal 10'. Unlike in phase P1, the content C is this time identified at step G1 as having already been cached in the network 1. The proxy server 20 does not transmit the request to the content distribution network 200, but redirects the request to the control server 30 during a step G2'.

The browser module 12' receives the redirection message during a step F7, and then resends the content-related request to the control server 30 during a step F8.

The control server 30 receives during a step E4 the request relating to the content C and transmits to the browser module 12' a redirection message to the content distribution network 100 of the network 1 in which the content C is stored.

The browser module 12' receives the redirection messaging during a step F9, and, during a step F10, redirects the request relating to the content C to the content distribution network 100 of the network 1.

The content C is received by the browser module 12' during a step F11.

The caching method has been described for the caching of only one given item of content at a time. In another embodiment, the messages exchanged can however easily be adapted in order to process several items of content simultaneously. In that case, during step G3, the proxy server 20 notifies that the browser module 12 has obtained several items of content in the same send action. The proxy server 20 can also notify of the obtaining of several items of content for various browser modules having a session established with it in the same send action. The selection by the control server 30 of the content distribution network during step E2 can then take into account all the items of content notified by the proxy server 20. The control server 30 can then send at step E3 a selected content distribution network identifier for several items of content in the same send action. The caching command is then sent as previously described during step G4 to each browser module that has obtained an item of content to be cached.

In another embodiment, the caching policy transmitted to the proxy server 20 during phase P1 can be transmitted to the browser modules associated with the proxy server 20. A browser module which has the caching policy is then capable of determining, as described at step G0, whether the content referred to in a request for an item of content provided by a given content provider is to be cached in a content distribution network of the network 1 according to the caching method, before actually sending the request. The request can thus if necessary be sent directly to the content provider without the proxy server 20 intervening.

In another embodiment, the identifier of the content in combination with the identifier of the distribution network in which the content has been cached is sent to the browser modules that have a session established with the proxy server. Thus, another request transmitted from one of these browser modules for the cached content can be redirected directly by this browser module to the distribution network in which the content has been cached.

The method has moreover been described with an implementation for the HTTP/2 over TLS protocol; however it can be adapted to any type of client-server exchange protocol exhibiting the same issues of access to content to be cached in a particular content distribution network.

Figure 3:
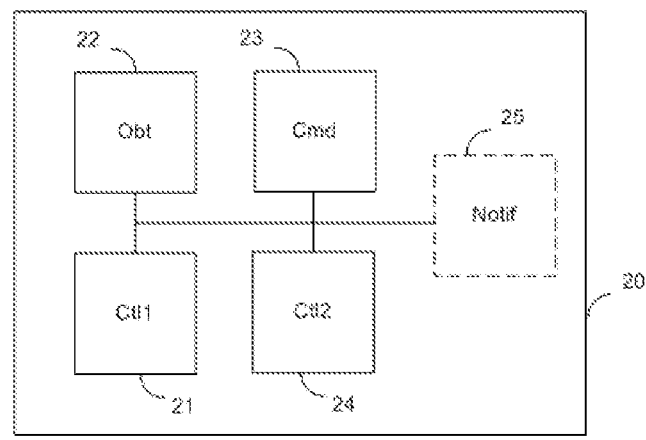
FIG. 3 represents a proxy server according to a particular embodiment.

A proxy server will now be described with reference to FIG. 3. Such a proxy server 20 notably comprises:

- a first control module 21, arranged to control the state of a session in progress between a browser module and a content provider;
- an obtain module 22, arranged to obtain from a browser module at least one item of information relating to a requested item of content;
- a command module 23, arranged to command a browser module to cache an item of content received by the latter in a content distribution network, the command containing an identifier of this distribution network;
- a second control module 24, arranged to check whether an item of content has been cached in a content distribution network;
- a notification module 25, arranged to notify a control server that an item of content has been delivered to a browser module.

In another embodiment, the notification module 25 is optional. This is notably the case when the method is implemented without a control server 30.

Figure 4:
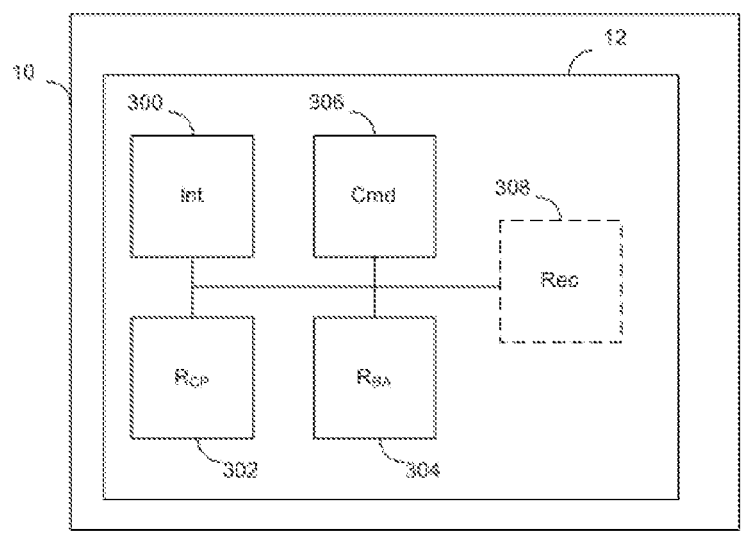
FIG. 4 represents a browser module in structural form according to a particular embodiment.

FIG. 4 represents a browser module 12 arranged to run on a terminal 10, said module comprising:

- an interrogation sub-module 300, arranged to access content by means of encrypted sessions and to send a request relating to an item of content to a content provider;
- a first receive sub-module 302, arranged to receive an item of content requested from a content provider;
- a second receive sub-module 304, arranged to receive from a proxy server a command for caching in a content distribution network a previously received item of content;
- a command sub-module 306, arranged to command, following reception of the caching command, the sending of an item of content, previously received by the terminal on which said module is running, to a content distribution network;
- a recording sub-module 308, arranged to log information on the requests relating to an item of content and transmitted from the browser module.

In another embodiment, the recording sub-module 308 is optional. This is notably the case when the caching method is implemented by a system according to the second particular embodiment described with reference to FIG. 1b.

The invention is implemented by means of software and/or hardware components. In this regard, the term "module" can be in this document a software component or a hardware component, or an assembly of hardware and/or software components, suitable for implementing a function or a set of functions, according to that which is described previously for the module concerned.

A software component corresponds to one or more computer programs, one or more sub-programs of a program, or more generally to any element of a program or software item. Such a software component is stored in memory, and then loaded and executed by a data processor of a physical entity, and is likely to access the hardware resources of this physical entity (memories, recording media, communication buses, electronic input/output boards, user interfaces, etc.).

In the same way, a hardware component corresponds to any element of a hardware assembly. This can be a hardware component that may or may not be programmable, with or without an integrated processor for executing software. This is for example an integrated circuit, a chip card, an electronic board for executing firmware, etc.

In a particular embodiment, the modules 21, 22, 23, 24 and 25 are arranged to implement the previously described caching method. These are preferably software modules containing software instructions to enable those of the steps of the previously described caching method, which are implemented by a proxy server, to be executed.

In one particular embodiment, the sub-modules 300, 302, 304, 306 and 308 are arranged to implement the previously described caching method. These are preferably software modules containing software instructions to enable those of the steps of the previously described caching method, which are implemented by a terminal on which a browser module runs, to be executed.

The invention also relates to:
- a program for a proxy server, comprising program code instructions intended to control the execution of the steps of the previously described caching method, when said program is executed by said proxy server;
- a recording medium that can be read by a proxy server on which the program for such a server is recorded.

The software modules can be stored in or transmitted by a data medium. This can be a hardware storage medium, for example a CD-ROM, a magnetic floppy disk or a hard disk, or a transmission medium such as an electrical, optical or radio signal, or a telecommunication network.

Although the present disclosure has been described with reference to one or more examples, workers skilled in the art will recognize that changes may be made in form and detail without departing from the scope of the disclosure and/or the appended claims.

The invention claimed is:

1. A method comprising:
caching an item of content in a first content distribution network, the first content distribution network being a network of a first communication network, a browser running on a user terminal and providing for accessing content by using encrypted sessions, the browser being associated with a proxy server, distinct from the user terminal and located in a second communication network, the second communication network being interconnected with the first communication network, the proxy server controlling the state of a session in progress between the browser and a content provider device, wherein the caching comprises:
the browser sending a request for an item of content to the content provider device;
the proxy server obtaining from the browser at least one item of information relating to the request;
the proxy server, located in the second communication network, transmitting the request to a second content distribution network located outside the first communication network;
the browser receiving the requested item of content from the second content distribution network;
the proxy server determining if the item of content is to be cached in the first communication network; and
the proxy server located in the second communication network commanding the browser to cache the item of content in the first content distribution network of the first communication network.

2. The method as claimed in claim 1, in which the control of the state of a session in progress comprises checking that the request is redirected by the proxy server to the content provider device, after the proxy server has received the request via an encrypted session established with the browser, the obtaining of the at least one item of information related to the request being obtained when the request is being received by the proxy server.

3. The method as claimed in claim 1, additionally comprising the following acts implemented by a control server belonging to the first communication network:
receiving from the proxy server, a notification indicating that the request for at least one item of content has been transmitted by the terminal on which the browser that has transmitted the request is running;
selecting, according to the content and the terminal, a first content distribution network in which to cache the content from among a set of content distribution networks belonging to the first communication network;
sending to the proxy server an identifier of the selected first distribution network.

4. The method as claimed in claim 3, additionally comprising an act of the control server receiving from the proxy server information relating to at least a second browser having a session established with the proxy server, the first content distribution network being selected based on the information.

5. The method as claimed in claim 3, additionally comprising an act of the control server sending to the proxy server a caching policy containing at least one item of data for which a caching of the content is triggered.

6. The method as claimed in claim 5, in which the at least one item of data is a list of uniform resource locators, the method additionally comprising an act of the proxy server checking, with the aid of the at least one item of information relating to the request, that the content provider device belongs to the list of uniform resource locators, the command to cache the content then being conditional upon whether the content provider device belongs to the list.

7. The method as claimed in claim 3, comprising the following acts:
the control server storing a cached content identifier in combination with an identifier of the first distribution network in which the content has been cached;
and following reception of a further content-related request:
the proxy server checking, with the aid of the content identifier and of the at least one item of information related to the request, that the requested content has been cached;
the proxy server redirecting the request to the first distribution network in which the requested content was previously cached.

8. The method as claimed in claim 7, additionally comprising an act of the proxy server sending the cached content identifier in combination with the identifier of the first distribution network in which the content has been cached to at least a second browser having a session established with the proxy server, another request transmitted from the at least one second browser for the requested content being redirected by the at least one second browser to the first distribution network in which the content has been cached.

9. The method as claimed in claim 1, additionally comprising the control server sending to the proxy server a set of instructions that can be executed by the browser, the set being transmitted by the proxy server, with the command requesting the caching of the content, and being executed by the browser prior to the caching.

10. A terminal comprising:
a data processor;
a non-transitory computer-readable medium comprising a browser stored thereon, which comprises program code instructions to command execution of the following acts, when the browser is executed on the data processor of the terminal:
   accessing content by using encrypted sessions and sending a request relating to an item of content to a content provider device;
   receiving the requested item of content from a second content distribution network, which is located outside of a first communication network;
   receiving from a proxy server, which is distinct from the user terminal and located in a second communication network, a command to cache the previously received item of content in a first content distribution network of the first communication network, the first communication network being interconnected with the second communication network; and
   commanding, following reception of the caching command, sending of the item of content previously received by the terminal on which the browser is running, to the first content distribution network of the first communication network.

11. A proxy server, located in a second communication network, connected with a browser running on a user terminal which is distinct from the proxy server, the proxy server comprising:
   a processor; and
   a non-transitory computer-readable medium comprising instructions stored thereon which when executed by the processor configure the proxy server to:
   control the state of a session in progress between the browser and a content provider device;
   obtain from the browser at least one item of information relating to a requested item of content;
   determine if the item of content is to be cached in a first content distribution network of a first communication network, the first communication network being interconnected with the second communication network;
   command the browser to cache an item of content received by the browser in the first content distribution network of the first communication network, the command containing an identifier of the first content distribution network; and
   check whether the item of content has been cached in a content distribution network.

12. A system for caching an item of content in a first content distribution network, the first content distribution network being a network of a first communication network, the system comprising:
   a proxy server located in a second communication network which is interconnected with the first communication network; and
   a terminal which is distinct from the proxy server and comprises a browser, which is associated with the proxy server located in the second communication network and comprises program code instructions to command execution of the following acts, when the browser is executed on a data processor of the terminal:
      accessing content by using encrypted sessions and sending a request relating to an item of content to a content provider device;
      receiving the requested item of content from a second content distribution network located outside the first communication network;
      receiving from the proxy server located in the second communication network a command to cache in the first content distribution network of the first communication network the previously received item of content; and
      commanding, following reception of the caching command, sending of the item of content previously received by the terminal on which the browser is running, to the first content distribution network of the first communication network;
   wherein the proxy server comprises program code instructions to command execution of the following acts, when the program code instructions are executed on a data processor of the proxy server:
      controlling the state of a session in progress between the browser and the content provider device;
      obtaining from the browser the at least one item of information relating to the requested item of content;
      determining if the item of content is to be cached in a first content distribution network;
      commanding the browser with a command to cache the item of content received by the browser in the first content distribution network, the command containing an identifier of the first content distribution network;
      checking whether the item of content has been cached in a content distribution network.

13. The system as claimed in claim 12, additionally comprising a control server, the control server belonging to the communication network and comprising program code instructions to command execution of the following acts, when the program code instructions are is executed on a data processor of the of the control server:
   select the first content distribution network in which to cache the content, and to
   notify the proxy server of the selected first content distribution network.

14. A non-transitory computer-readable medium comprising a program stored thereon for a proxy server, comprising program code instructions to control execution of, when the program is executed by a processor of the proxy server, the proxy server located in a second communication network and being connected to a browser, wherein the method comprises:
   controlling a state of a session in progress between the browser, which is running on a terminal that is distinct form the proxy server, and a content provider device;
   obtaining from the browser at least one item of information relating to a requested item of content;
   determining if the item of content is to be cached in a first content distribution network of a first communication network, the first communication network being interconnected with the second communication network;
   commanding the browser with a command to cache the item of content received by the browser in the first content distribution network of the first communication network, the command containing an identifier of the first content distribution network;
   checking whether the item of content has been cached in a content distribution network.

15. A non-transitory computer-readable medium comprising a browser stored thereon, which comprises program code instructions to command execution of the following acts, when the browser is executed on a data processor of a terminal:
   accessing content by using encrypted sessions and sending a request relating to an item of content to a content provider device;

receiving the requested item of content from a second content distribution network, which is located outside of a first communication network;

receiving from a proxy server, which is distinct from the terminal and is located in a second communication network, a command to cache the previously received item of content in a first content distribution network of the first communication network, the first communication network being interconnected with the second communication network; and commanding, following reception of the caching command, sending of the item of content previously received by the terminal on which the browser is running, to the first content distribution network of the first communication network.

* * * * *